No. 655,946. Patented Aug. 14, 1900.
H. A. ADAMS.
CORN SHELLER.
(Application filed July 20, 1899.)

(No Model.) 4 Sheets—Sheet 1.

Witnesses:
W. C. Corlies
W. H. Colton.

Inventor:
Henry A. Adams.
By Louis K. Gillson
Atty.

No. 655,946. Patented Aug. 14, 1900.
H. A. ADAMS.
CORN SHELLER.
(Application filed July 20, 1899.)
(No Model.) 4 Sheets—Sheet 2.

Witnesses:
W. C. Coilies
W. H. Cotton

Inventor:
Henry A Adams.
By Louis K Gibson
Atty.

No. 655,946. Patented Aug. 14, 1900.
H. A. ADAMS.
CORN SHELLER.
(Application filed July 20, 1899.)
(No Model.) 4 Sheets—Sheet 3.
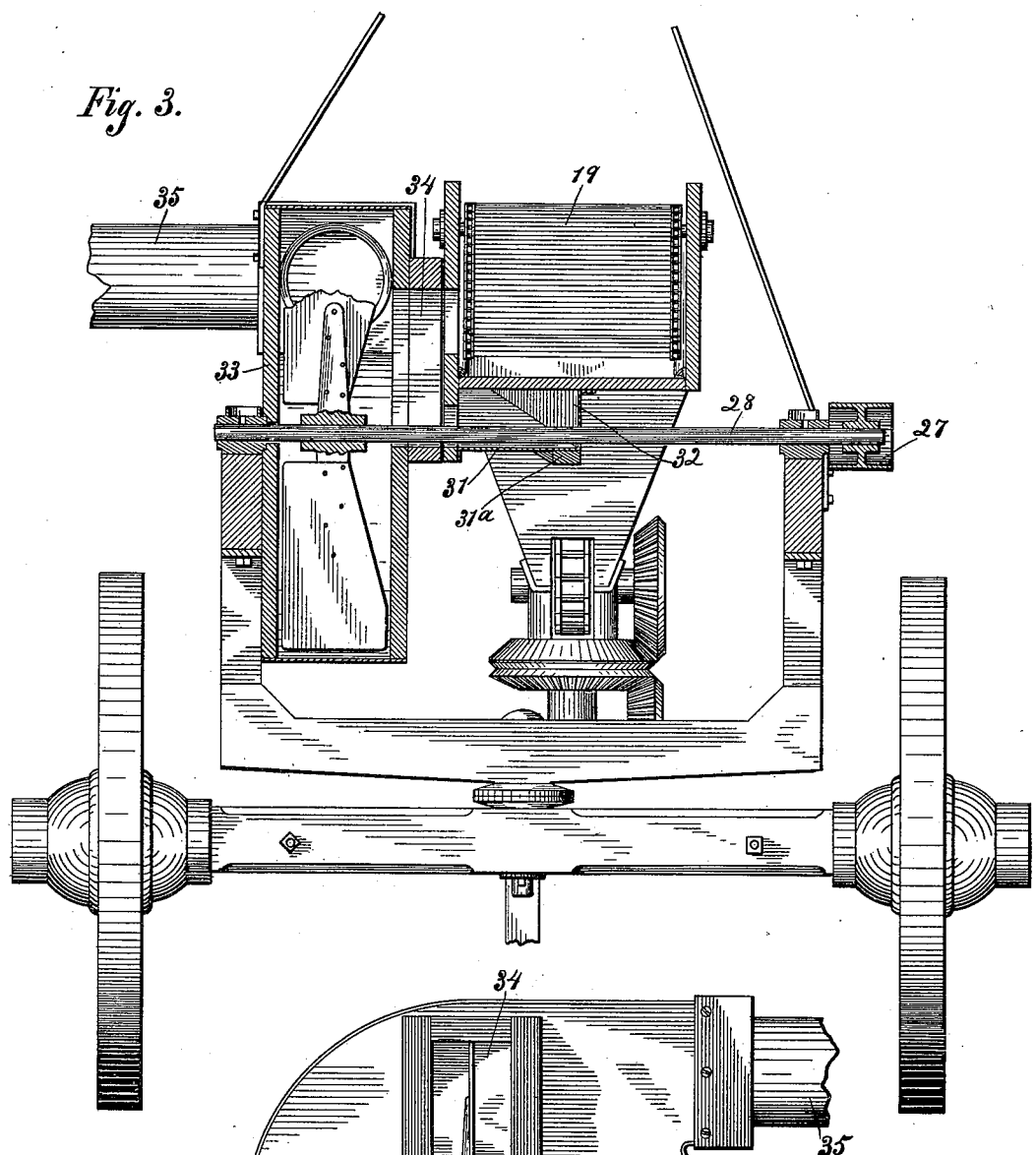
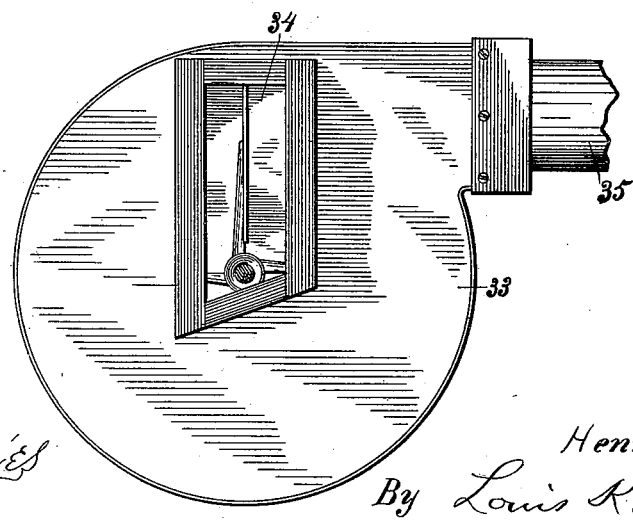
Witnesses:
W. C. Corlies
W. H. Cotton.
Inventor:
Henry A. Adams.
By Louis K. Gillson
Atty No. 655,946. Patented Aug. 14, 1900.
H. A. ADAMS.
CORN SHELLER.
(Application filed July 20, 1899.)
(No Model.) 4 Sheets—Sheet 4.
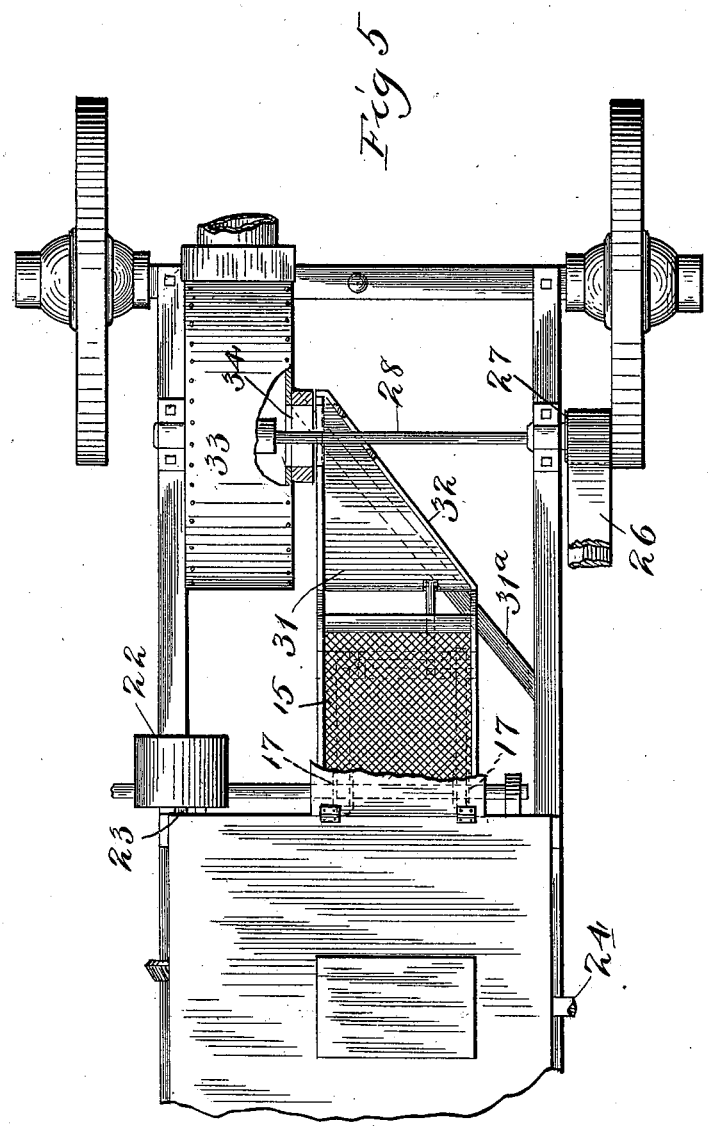
Witnesses
W. C. Cocles
W. H. Cotton.
Inventor.
Henry A. Adams
By Louis K. Gleason
Atty.

UNITED STATES PATENT OFFICE.

HENRY A. ADAMS, OF SANDWICH, ILLINOIS.

CORN-SHELLER.

SPECIFICATION forming part of Letters Patent No. 655,946, dated August 14, 1900.

Application filed July 20, 1899. Serial No. 724,439. (No model.)

*To all whom it may concern:*

Be it known that I, HENRY A. ADAMS, a citizen of the United States, and a resident of Sandwich, in the county of De Kalb and State of Illinois, have invented certain new and useful Improvements in Corn-Shellers, of which the following is a specification, and which are illustrated in the accompanying drawings, forming a part thereof.

This invention relates particularly to what are commonly known as "picker-wheel" corn-shellers; and its object is to provide shellers of this character with an exhaust-fan supplementing the usual blower and applying draft at such point and in such manner as to separate the loose husks from among the cobs and in doing so to entirely shake out from among them any grain which may have been carried out and which would otherwise be lost, free the cobs from dust and loose husks, and convey the dust away from the machine, so that it will not annoy the operators. This object is accomplished by the mechanism hereinafter fully described and which is illustrated in the accompanying drawings, in which—

Figure 1:
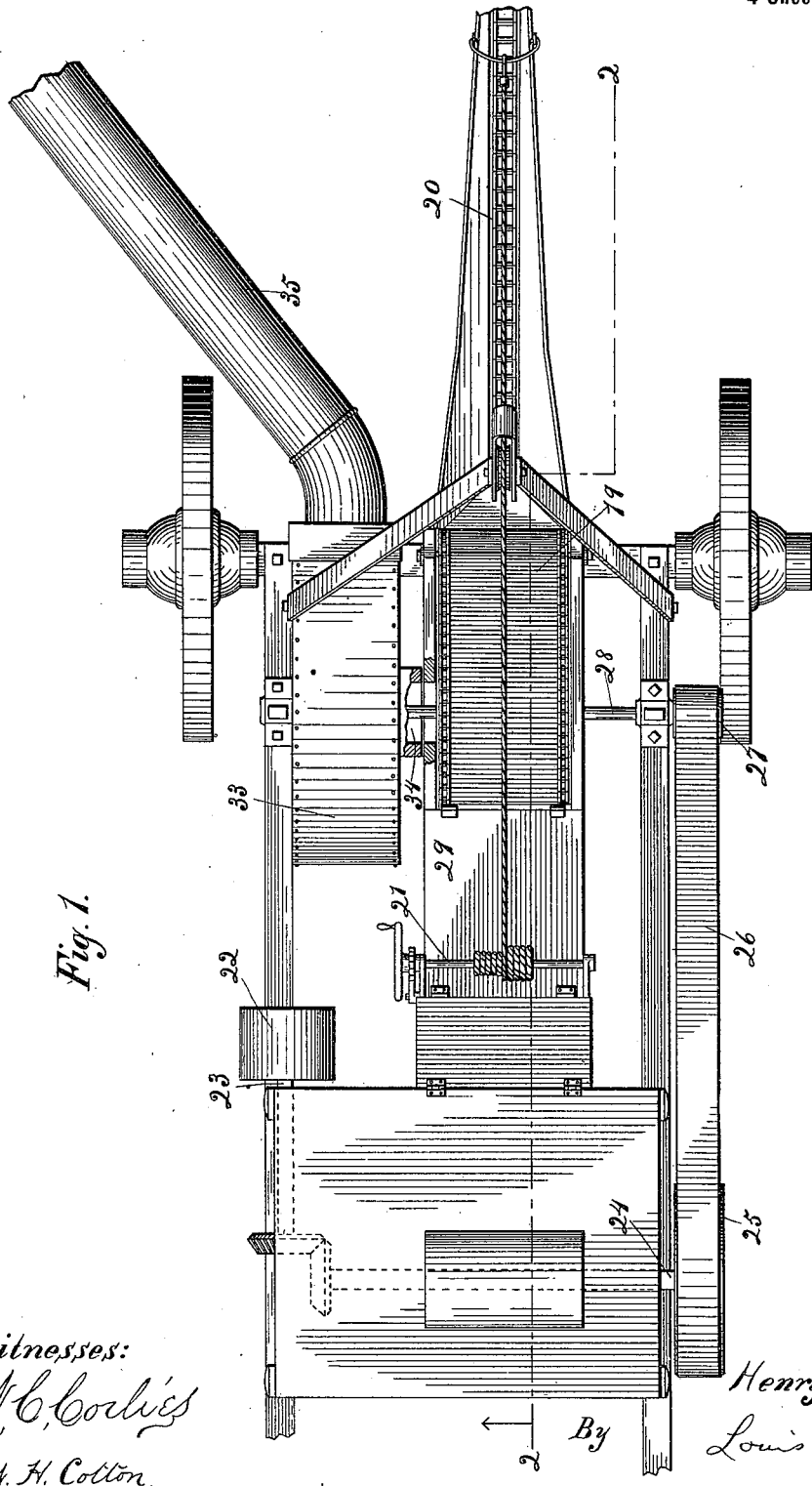
Figure 2:
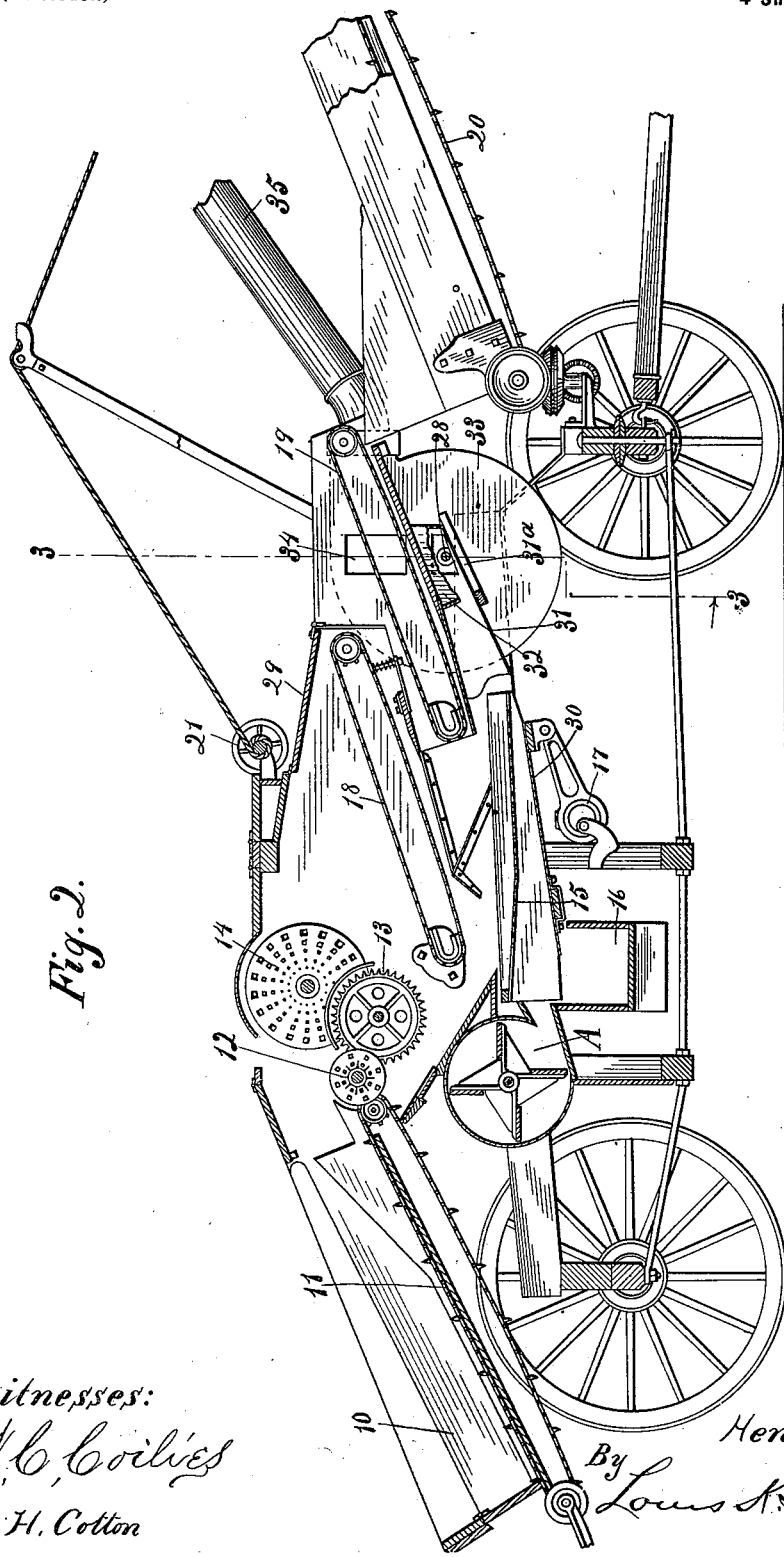

Figure 1 is a detail plan view of the corn-sheller. Fig. 2 is a longitudinal section on the line 2 2 of Fig. 1. Fig. 3 is a transverse section on the line 3 3 of Fig. 2. Fig. 4 is a detail of the exhaust-fan, and Fig. 5 is a detail plan section of a part of the machine.

The machine to which the invention applies is ordinarily mounted upon running-gear, as shown in the drawings, and comprises a feeder 10, having an elevating-carrier 11; shelling mechanism comprising a picker-wheel 12, a runner-wheel 13, a turning disk 14, and other details which for the purpose of this case it is not necessary to illustrate; a grain-riddle 15; a grain-chute 16; reciprocating mechanism 17 for vibrating the riddle; a blower A and cob-rake 18 in the form of an endless carrier; a second cob-rake 19, also in the form of an endless carrier and leading upwardly from below the upper end of the rake 18, so that the material discharged from the latter falls upon it and a cob-stacker 20, receiving the material as discharged from the cob-rake 19 and being supported by means of the windlass 21.

Power to drive the machine is applied to the pulley 22, mounted upon a shaft 23, from which is driven, by means of beveled gears, a shaft 24, carrying a pulley 25, upon which runs a belt 26, leading to the pulley 27, mounted upon a shaft 28.

The further details of the operating mechanism of the machine need not be here described, as they are well known in this type of machines and do not pertain to the present improvements.

The blower A is so located that it drives the blast upwardly through the riddle 15 and following along the direction of movement of the cobs as they are carried by the rakes. The top of the machine is closed in, as shown at 29, and leading upwardly from the incline or shoe 30 below the riddle 15 there is a floor 31, which is attached to and reciprocates with the riddle and its shoe. The inner end of this floor is spaced apart from the end of the riddle to allow the particles of cob, dust, and other refuse which are not carried forward by the blast to drop through to the ground. The outer end of the reciprocating floor 31 is supported upon a suitable bearing, as the cross-bar 31$^a$, and at its extreme end there is located a wall 32.

The sides of the machine are walled in, so that all the dust driven forward by the blast from the blower A is concentrated near the cob-discharging end of the machine. At one side of this end of the machine there is placed an exhaust-fan, the case of which is shown at 33, and the eye 34 of this fan is open directly to the chamber into which the dust has been concentrated, as above described, and is elongated vertically, so as to extend above and below the cob-rake 19. This fan is driven by the shaft 28, and its suction is sufficient to entirely withdraw the accumulated dust and the loose husks from among the cobs, and in addition to this function it thoroughly agitates and overturns any of the husks which may be present upon the cob-rake 19, whether they be loose or attached to the cobs, and thereby liberates any grain which may have found lodgment among them and permits it to fall through the cob-rake and then back through the riddle 15 and to the chute 16. This action is the more efficient because the suction is applied to the material as it falls from the rake 18 to the rake 19.

It is the present practice of corn-handlers to send the ears to the sheller but partially denuded of their husks. This practice has grown to such proportions that it is not uncommon for the husker to do but little more than loosen up the husk, and for this reason it has become more difficult for shelling-machines to separate out the grain, although it may have been entirely loosened from the cob.

The use of corncobs for fuel has become very general in some parts of the country and is becoming more and more prevalent. The value of such fuel is greatly augmented when it is not only entirely freed from dust, but when it is also free from the husks, while the latter have a material value for fodder.

By the improvement in shellers as herein described all of the grain is saved, the cobs are thoroughly cleaned, and the husks eliminated. Furthermore, the dust is conveyed away through the spout 35, leading from the exhaust-fan, and discharged at any suitable distance and direction from the sheller, so that the operators are entirely relieved from annoyance by it.

While I have shown in the drawings a picker-wheel sheller, the improvements are applicable to other forms, as the particular kind of shelling mechanism is not material to its action.

The reciprocating floor-plate 31 is triangular in form, and the wall 32 is oblique as to the machine, so that it serves as a guide for the blast toward the eye of the exhaust-fan.

I claim as my invention—

1. In a corn-sheller, the combination with shelling mechanism, cob-carrier and grain-receiver, of a blower adapted to drive a current of air through the grain falling from the shelling mechanism and in the direction of advance movement of the cob-carrier, and a suction-fan so located as to apply draft laterally to the passage through which the cobs are discharged.

2. In a corn-sheller, the combination with shelling mechanism, a cob-carrier and a grain-receiver, of a blower adapted to drive a current of air through the grain falling from the shelling mechanism and in the direction of advance movement of the cob-carrier, and a suction-fan so located as to apply draft laterally to the passage through which the air-current is driven and the cobs conveyed.

3. In a corn-sheller, in combination, shelling mechanism, grain-receiver, a cob-carrier leading from below the shelling mechanism, a second cob-carrier leading from below the delivery end of the first-mentioned cob-carrier, a suction-fan arranged to apply draft laterally at the point of discharge from the one cob-carrier to the other.

4. In a corn-sheller, in combination with a case having a grain-chute and cob-discharge orifice, and with shelling mechanism, a cob-carrier leading from below the shelling mechanism, a second cob-carrier leading from below the discharge end of the first-mentioned cob-carrier to the cob-discharge orifice, and a blower arranged to drive an air-current across the passage from the shelling mechanism to the chute, and toward the cob-discharge orifice, all of such parts being inclosed within the case; of an exhaust-fan having its eye opening through the side of the case and to the passage through which the second cob-carrier is led.

5. In a corn-sheller, in combination, a case having a cob-discharge orifice, shelling and conveying mechanism within the case, one conveyer leading to the cob-discharge orifice, a blower adapted to drive an air-current through the case and toward the cob-discharge orifice, an exhaust-fan adapted to apply draft laterally to the passage through which the named conveyer leads, its eye extending above and below such conveyer.

6. In a corn-sheller, in combination, shelling mechanism, a riddle for receiving the shelled grain, a blower for throwing a blast of air across the riddle, a chamber for receiving such blast after it crosses the riddle, the floor of such chamber being inclined upwardly from the riddle, mechanism for causing the reciprocation of the inclined floor, and a suction-fan having its eye open to such chamber.

7. In a corn-sheller, in combination, a case, an exhaust-fan for withdrawing the dust from the case, an inclined reciprocating plate leading to the eye of the fan, and a riddle adjacent to the foot of the plate but spaced apart therefrom to provide an orifice for the escape of material not carried out by the fan.

8. In a corn-sheller, in combination, a case, an exhaust-fan for withdrawing the dust from the case, an inclined reciprocating plate leading to the eye of the fan, a riddle adjacent to the foot of the plate but spaced apart therefrom to provide an orifice for the escape of material not carried out by the fan, and a blower arranged to drive an air-current across the riddle and toward the inclined plate.

9. In a corn-sheller, in combination, a case, an exhaust-fan for withdrawing the dust from the case, a reciprocating riddle, and an inclined plate attached to the riddle so as to reciprocate therewith and leading therefrom to the eye of the fan.

HENRY A. ADAMS.

Witnesses:
 PAUL CARPENTER,
 LOUIS K. GILLSON.